United States Patent [19]

Gilmore et al.

[11] Patent Number: 4,540,616
[45] Date of Patent: Sep. 10, 1985

[54] CARCASS SHROUD AND METHOD OF APPLICATION

[75] Inventors: Thomas F. Gilmore, Greenville, S.C.; Hershel E. Ratliff, Council Bluffs, Iowa

[73] Assignee: The Stearns & Foster Company, Cincinnati, Ohio

[21] Appl. No.: 567,508

[22] Filed: Jan. 3, 1984

[51] Int. Cl.$^3$ .................... A23B 4/00; B65D 85/70
[52] U.S. Cl. ..................................... 428/131; 426/84; 426/106; 426/125; 426/129; 426/132; 426/135; 426/323; 426/324; 426/415; 426/442; 428/219; 428/220; 428/296; 428/305.5; 428/308.4; 428/311.5; 428/332; 428/336; 428/340
[58] Field of Search ............... 426/84, 106, 125, 129, 426/132, 135, 323, 324; 428/219, 131, 220, 296, 305.5, 308.4, 311.5, 336, 340, 289

[56] References Cited

U.S. PATENT DOCUMENTS

| | | |
|---|---|---|
| 2,158,462 | 5/1939 | Koenig . |
| 2,371,967 | 3/1945 | Lohner et al. . |
| 2,685,521 | 8/1954 | Edgar . |
| 2,697,664 | 12/1954 | Goeser et al. . |
| 2,699,396 | 1/1955 | Francis . |
| 2,824,011 | 2/1958 | Williams . |
| 3,124,468 | 3/1964 | Williams . |
| 3,275,455 | 9/1966 | Williams . |
| 3,539,435 | 11/1970 | Williams . |
| 3,741,260 | 6/1973 | Kocay . |
| 4,097,963 | 7/1978 | Hammer et al. . |
| 4,100,319 | 7/1978 | Schwartz . |
| 4,163,070 | 7/1979 | Williams . |

*Primary Examiner*—James C. Cannon
*Attorney, Agent, or Firm*—Wood, Herron & Evans

[57] ABSTRACT

A carcass shroud is formed from a liquid water porous hydrophobic and oleophilic polyolefin sheet. Preferably, the sheet is a spun-bonded fabric, such as spun-bonded polypropylene or a perforated polyolefin film having liquid water porosity. Preferably, a surfactant is dispersed throughout the shroud fabric or coated onto the film. Sodium chloride may also be dispersed in the shroud or onto the shroud surface. Such a carcass shroud can be applied to a carcass in a dry state, i.e., without being wetted with brine prior to application. The porous nature of the sheet or film allows liquid water to pass through while the oleophilic nature of the material causes it to hug tightly to the warm fat of the carcass. The salt acts to bleach the surface of the carcass and the surfactant acts to draw blood from the carcass, substantially enhancing its appearance. After cooling, the shroud readily releases from the carcass and does not leave fibrous contamination, as do known shrouds.

14 Claims, No Drawings

CARCASS SHROUD AND METHOD OF APPLICATION

BACKGROUND OF THE INVENTION

When cattle are slaughtered, they are initially stunned or killed and blood is drained from their carcasses. The carcass is subsequently skinned and cut into halves. These halves are referred to as sides of beef. The sides of beef are then cooled and graded by a government inspector in preparation for sale.

Between the time that the carcass is skinned and the time that it is inspected, the carcass must be stored and refrigerated to remove body heat. During this chilling period, if not shrouded the carcass tends to lose excessive amounts of natural moisture. This natural moisture enhances the quality of the meat and adds to the weight of a carcass. In order to avoid excessive water loss, it has become the custom to cover the carcass with a piece of fabric usually called a shroud. The shroud, which is typically soaked in brine, tightly fixes against the outer surface or warm fat of the carcass.

These brine-soaked shrouds serve several purposes. Of course, one purpose is to retain the natural moisture within the carcass. The brine also acts to bleach and disinfect the surface of the carcass, making it more appealing. Since the carcass shroud tightly stretches over the surface of the carcass, it smoothes the warm fat, making it more appealing to the eye and causing the carcass to receive a better grade from the government inspector. These shrouds have been made from various fabrics. These include cotton, rayon, ramie, polyethylene terephthalate (PET), as well as plastic films bonded to cotton or the like.

The natural fiber shrouds have several disadvantages. First of all, they must be soaked and applied wet or they will stick to the surface of the carcass and pull away fat when removed. Cotton shrouds, even when applied wet, tend to stick to the surface of the carcass leaving textile fibers behind. The cotton fibers remaining on the carcass are a source of contamination which can result in reduced storage life for the meat.

These shrouds are also very expensive, and accordingly, are not disposable. They must be reused repeatedly. This presents somewhat of a dilemma. Used shrouds are contaminated with microorganisms. Because of the quality of these shrouds, they will not withstand the thorough washing and sterilization required to kill the microorganisms growing on the shrouds. Accordingly, the reuse of natural fiber or cotton shrouds tends to carry microorganisms to the surface of the carcass. In the past, this problem has been solved by adding an antibiotic to the shroud or by applying the antibiotic to the carcass prior to shrouding. Excessive bacterial contamination results in reduced storage life for the meat.

Goeser U.S. Pat. No. 2,697,664 discloses a modified cotton shroud wherein one side of the cotton shroud is coated with a perforated plastic film. The shroud was stated to have a water vapor permeability of from 0.25 to 2.75 grams per 50 cm$^2$ per 24 hours at room temperature and such a shroud prevents surface water from passing through the shroud. Also, this shroud contained body heat and increased the time for lowering to a safe level the interior body temperature of the carcass. In other words, the film prevents escape of evaporative water and, thus, the cooling rate of the carcass is reduced. Other examples of employing films with pin holes or perforations to provide a moisture-vapor permeability or transmission rate between 0.25 and 2.75 grams per 50 cm$^2$ per 24 hours at room temperature and 100% relative humidity are disclosed in U.S. Pat. No. 2,699,396 in combination with an absorptive layer of fibrous material.

U.S. Pat. No. 3,124,468 discloses the application of a plastic coated cotton or cellulosic fiber shroud in a dry state onto a carcass. The fibrous side is applied against the carcass. This method is totally unsatisfactory because a dry cellulosic, fibrous fabric applied to the warm carcass fat will stick to the carcass and pull fat from the carcass when it is eventually separated from the chilled carcass.

A recent development, as reported in Kocay U.S. Pat. No. 3,741,260, is the use of a non-swelling, non-wicking meat shroud of high tenacity polyethylene terephthalate (PET) staple fibers. These shrouds are unacceptable because they do not sufficiently adhere to the surface of the carcass. As water seeps from the carcass, it pushes the PET material away from the carcass. A shroud which does not sufficiently adhere to the surface of a carcass does not act to smooth the outer fat layer of the carcass. In fact, a PET shroud will loosen from the carcass during chilling. Thus, when the shroud is removed, the carcass does not have a smooth appearance which results in a downgrading of the beef.

Thus, until now, no one has produced a low cost effective carcass shroud.

SUMMARY OF THE INVENTION

The present invention is premised upon the realization that a carcass shroud formed from a hydrophobic oleophilic liquid water porous polyolefin sheet material would function satisfactorily as a carcass shroud. More specifically, such a shroud permits passage of liquid surface water, but tends to retard overall water loss from the carcass. Further, this unique shroud adheres to the surface of the carcass during cooling after slaughter and yet is easily removed from the carcass without leaving unwanted fibers and the like on the carcass surface after cooling. By reason of its hydrophobic polyolefin character and its virgin nature, the inventive shroud is not receptive to microorganisms and thus, is in a relatively aseptic state for application. Preferably, the carcass shroud is formed from a sheet of spun-bonded polyolefin, such as polyethylene or polypropylene, which is very superior over known carcass shrouds. Further, these unique shrouds can include solid sodium chloride dispersed throughout the shroud and can be applied to the carcass dry. Another example of a polyolefin sheet is a thin film of polyethylene or polypropylene preferably on the order of about 0.5 to 1 mil which has minute perforations formed therein. In comparison to the prior art multi-layered fiber and film structures having a low vapor permeability, the sheet or film of this invention critically requires liquid water porosity or a moisture transmission rate several thousand fold greater than such prior multi-layered fiber and film structures. Surprisingly it has been found that a relatively non-sorptive hydrophobic plastic film can be made to provide superior results in contrast to the prior art multi-layered fiber and film structures disclosed in the patents cited above.

In a most preferred form, the shrouds are treated with a surfactant. In this form the shrouds have been found to instantly draw blood and surface water through the normally hydrophobic material and to come into direct contact with warm fat when pressed against the carcass. Preferably a dry shroud containing preferably surfactant is used. The dry shroud eliminates the need for wetting with antibiotic, it is easier to handle and surprisingly quickly adheres to the warm fat. A further advantage of the dry shroud is the ability to mechanize the method of application. In one preferred form the shroud is a spun-bonded or open fabric sheet material such as spun-bonded polyolefin, particularly polypropylene. In another form the shroud is perforated thin polyolefin film of about 0.5 to about 1 mil in thickness.

DETAILED DESCRIPTION

A carcass shroud, according to the present invention, is a rectangular sheet of material of a size sufficient to cover at least the fat-covered portion of one side of beef. It has been found, according to this invention, that only the fat-covered portion of the beef side need be covered in order to achieve the desired results of natural moisture retention of the entire carcass and fat-smoothing to enhance quality. For use in the present invention, the fabric or film must be a hydrophobic oleophilic liquid water porous polyolefin.

With reference to a carcass shroud, the terms "hydrophobic liquid water porous" mean the tendency of the shroud not to adhere to the blood or water and to instantly pass liquid water or blood. The result is that the shroud is in direct contact with the carcass surface fat without a moisture interface. Porosity of the shroud must be sufficient so that the liquid water and blood on the surface of the carcass oozes or seeps through the polyolefin sheet when pressed tightly against the warm fat of the carcass. The term "oleophilic" refers to the affinity of the polyolefin to the warm fat. For purposes of the present invention, the shroud material must tightly cling to the warm fat on the carcass and, upon application, it smooths the warm fatty surface of the carcass.

Generically, the material must be a polyolefin formed from a short-chained olefin. Polyolefin specifically refers to thermoplastic polymers formed from simple olefins including polyethylene, polypropylene, polybutene, polybutadiene, polyisoprene and copolymers and terpolymers, etc. Specifically preferred are polyethylene, polypropylene and polybutadiene. The material itself can be a liquid water porous film or a woven or non-woven web, and presently most preferably is a spun-bonded web. Specific methods of manufacturing such webs are well known. For example, one such method is disclosed in U.S. Pat. No. 4,100,319 which is incorporated herein by reference. A spun-bonded web has the required porosity to allow liquid water to pass through the web and still achieve all the other advantages of this invention.

Preferably, the spun-bonded shroud is co-extruded and ranges in basis weight from about 1 oz./yd.$^2$ to about 2 oz./yd.$^2$, and a thickness from about 8 mils to 16 mils. In another embodiment, the shroud is a thin polyolefin film of about 0.5 to about 1 mil in thickness which is perforated such as by vacuum embossing or other known techniques so that liquid water will pass therethrough. This, of course, will vary depending on the polyolefin material selected for use. It has been found that a spun-bonded polypropylene having a basis weight of about 1.5 oz./yd.$^2$ and a thickness of about 12 mils is suitable for use as a carcass shroud.

The porosity of the shroud is very important. If the shroud traps water against the surface of the warm fat, it will assist in the breeding of bacteria and prevent the shroud from adhering to the carcass. Accordingly, the shroud must be sufficiently porous to permit water to quickly pass from the carcass surface through the shroud as a liquid. Mere vapor permeability is insufficient. The porous nature of a web, particularly a spun-bonded web, makes this material particularly suitable for this invention. Water which passes through the shroud evaporates and this accelerates the cooling of the carcass by removal of body heat.

Preferably, solid sodium chloride and a surfactant are dispersed throughout the spun-bonded carcass shroud of the present invention or coated onto the film carcass shroud. Prior art shrouds were soaked in brine and applied wet onto the carcass. The salt in the brine solution acts to bleach the surface of the carcass, giving it a more appealing appearance. Surprisingly, the carcass shroud of the present invention can be applied dry without increasing water loss. However, it is still desirable to treat the carcass with salt. Accordingly, the shroud material of the present invention includes solid sodium chloride. Alternatively, the shroud may be sprayed with a chlorine containing spray. The solid sodium chloride is applied to the shroud material by soaking it in brine or spraying brine directly onto the fabric and allowing the fabric to dry. Crystalline sodium chloride will then form throughout the fabric. Preferably about 30 to about 40 grams of sodium chloride per square yard of the shroud material will be present. Specifically, about 37 g/yd.$^2$ has been found to be acceptable.

The shroud also preferably includes an amount of a surfactant effective to cause blood and water on the exterior of the carcass to be instantly pulled into the shroud. As developed above, a dry porous polyolefin shroud containing surfactant has been found to quickly pass the interfacial water from the carcass and achieve a rapid conformation with the warm fat. These unique results make this embodiment of the dry shroud with surfactant preferred. Suitable surfactants would include cationic, anionic and non-ionic surfactants with anionic and non-ionic surfactants being preferred. The surfactant aids in the removal of water and blood from the surface of the carcass. Suitable anionic surfactants include (1) saponified fatty acids or soaps, (2) saponified petroleum oils such as sodium salts or organic sulfonates or sulfates, or (3) saponified esters, alcohols or glycols, with the latter being well known as anionic synthetic surfactants. Examples of these anionic surfactants include the alkaryl sulfonates or amine salts thereof such as sulfonates of dodecyl benzene or diethanolamine salt of dodecyl benzene sulfonic acid. Most of these sulfonates contain many chemical species. The class name given to most of them is "alkylaryl sulfonate". Simply, this means that a paraffinic hydrocarbon is bonded to an aromatic or benzene nucleus and the aromatic portion has been sulfonated. Examples of saponified fatty acids ($C_6$–$C_{24}$) are the sodium or potassium salts of myristic, palmitic, stearic, oleic or linoleic acids or mixtures thereof. Also in this class of anionic surfactants are alkali and alkaline earth metal salts or neutral phosphoric acid esters of oxylalkylated higher alkyl phenols or aliphatic monohydric alcohols. "Aerosol OT" is a dioctyl alkali metal sulfosuccinate anionic surfactant made by Cyanamide. The nonionic surfactants suitable for use commonly have hydrophylic portions or side chains usually of the polyoxyalkylene type. The oil soluble or dispersible part of the molecule is derived from either fatty acids, alcohols, amides or amines. By suitable choice of starting materials and regulation of the length of the polyoxyalkylene chain, the surfactant parts of the nonionic detergents may be varied as is well known. Suitable examples of nonionic surfactants include alkylphenoxy polyoxyethylene glycol, for example, ethylene oxide adduct of either acryl-, nonyl- or tridecyl- phenol and the like. These mentioned nonionic surfactants are usually prepared by the reaction of the alkyl phenol with ethylene oxide. Commercial products are sold under the trademarks "Triton X-100" by Rohm and Haas Co. or "Tergitol" by Union Carbide which are alkyl phenyl ethers of polyethylene glycol. Other specific examples of nonionic surfactants include glyceryl monooleate, oleyl monoisopropanolamide sorbitol dioleate, alkylol amides prepared by reacting alkanolamides such as monoisopropanolamine, diethylanolamine, or monobutanolamine with fatty acids such as oleic, perlargonic, lauric and the like. The cationic surfactants are also well developed and mainly include betaines and quaternary ammonium compounds. Some specific examples of betaines include imidazoline betaines, aliphatic and carbocyclic betaines, and betaines with herero atoms in the hydrophobic chains such as dodecyloxpropyldimethyl aminoacetic acid. Typical of the quaternary ammonium compounds that may be mentioned are dimethyl dicoco ammonium chloride, cetyl pyridinium acetate, methyl cetyl piperidinium propionate, N,N dilauryl, N,N dimethyl ammonium diethophosphate, and the like. Thus, it will be understood that other anionic, cationic or nonionic surfactants may be employed in accordance with the principles of this invention.

The concentration of surfactant will vary depending on the surfactant used. Rohm and Haas Triton X-100 is effective at a concentration of about 6 g/yd.$^2$. This is a preferred surfactant because its use in contact with food products has been approved by the FDA.

In use, the salt and surfactant are impregnated into spun-bonded polyolefin fabric, then it is applied to the warm carcass surface and pressed against the carcass fat surface, smoothing the fabric against the carcass and forcing surface water and blood through the fabric. The water passing through the shroud will evaporate which in turn will physically assist in the rapid cooling of the carcass. This minimizes bacterial growth. Although the fabric can be wet when applied to the carcass, as developed above, it is preferably applied dry to facilitate ease in application and eliminate any wetting step. The application of this shroud in a dry state surprisingly does not increase water loss. It does not cause the shroud to stick to the fat of the carcass as would a dry cotton shroud.

Prior to grading by the government inspector, the shroud is removed from the carcass by simply pulling it away from the surface. Surprisingly, due to the nature of the spun-bonded polyolefin fabric, it does not stick to the surface of the carcass, and in fact, does not leave any fibers along the surface of the carcass. Preferably, the removed shroud is discarded. Due to the low cost of manufacturing these shrouds, it is economical to do so.

EXAMPLES 1–8

The following eight examples illustrate the shrouding of carcass sides with spun-bonded polypropylene shrouds as compared to known cotton shrouds. The spun-bonded polypropylene shroud had a basis weight of 1.5 oz./yd.$^2$ and a thickness of about 12 mils and a liquid water permeability. The water vapor transmission rate (WVTR) was about 2900 gm/50 cm$^2$/24 hours at 93% relative humidity. Both types of shrouds were applied to hot slaughtered beef, weighed hot and then weighed cold to determine shrinkage. These examples demonstrated that the shroud #1 type which was the spun-bonded polypropylene of the invention provided essentially an identical level of shrinkage in comparison to the cotton shroud type #2 in the 1–8 sides of beef which were shrouded and cooled through 24, then 96 hours, after slaughter. Shroud type #1 of examples 1–4 was simply washed with Triton X-100 in a washer to provide about 6 g/yd.$^2$ of surfactant upon drying. The dried shroud #1 type was then applied in its dry state to carcasses 1–4. The cotton shrouds were first soaked in brine and applied in standard wet fashion to carcasses 5–8.

| Example No. | Carcass No. | Hot Weight | Cold Weight | % Shrink |
|---|---|---|---|---|
| SHROUD #1 - DRY SPUN-BONDED POLYPROPYLENE (24 hours) | | | | |
| 1 | #1-Right | 308.10 | 305.80 | .75 |
| 2 | #2-Left | 326.90 | 324.10 | .86 |
| 3 | #3-Right | 283.30 | 281.60 | .60 |
| 4 | #4-Left | 305.60 | 303.70 | .71 |
| AVERAGES | | 305.98 | 303.80 | .71 |
| SHROUD #1 - DRY SPUN-BONDED POLYPROPYLENE (96 hours) | | | | |
| 1 | #1-Right | 308.10 | 302.50 | 1.82 |
| 2 | #2-Left | 326.90 | 321.40 | 1.68 |
| 3 | #3-Right | 283.30 | 279.00 | 1.52 |
| 4 | #4-Left | 305.60 | 300.30 | 1.73 |
| AVERAGES | | 305.98 | 300.80 | 1.69 |
| SHROUD #2 - COTTON (24 hours) | | | | |
| 5 | #1-Left | 314.50 | 312.20 | .73 |
| 6 | #2-Right | 335.90 | 333.60 | .68 |
| 7 | #3-Left | 291.50 | 289.90 | .55 |
| 8 | #4-Right | 302.10 | 300.30 | .60 |
| AVERAGES | | 311.00 | 309.00 | .64 |
| SHROUD #2 - COTTON (96 hours) | | | | |
| 5 | #1-Left | 314.50 | 308.50 | 1.91 |
| 6 | #2-Right | 335.90 | 330.40 | 1.64 |
| 7 | #3-Left | 291.50 | 287.00 | 1.54 |
| 8 | #4-Right | 302.10 | 297.10 | 1.66 |
| AVERAGES | | 311.00 | 305.75 | 1.69 |

This data demonstrated the surprising result that even though the spun-bonded polypropylene shroud was applied dry, no increase water loss occurred from the carcasses. The carcass shrinkage was essentially independent of the type of shroud used. Furthermore, upon application to the hot carcasses, the porous polyolefin shrouds quickly caused the surface blood and water to ooze from the carcass through the shroud and the shroud conformed to the fatty tissue. This was not the case with the cotton shroud. Upon cooling, the polyolefin shroud came off the beef very easily and beef sides had an excellent quality appearance. However, the cotton shrouds left textile fibers in the beef fat. The method of the invention, as demonstrated by these examples, also shows the simplicity and advantages over prior art methods of applying shrouds with wet brine solution and the adverse effects of that known method on the worker.

EXAMPLES 9–62

The following examples 9–62 were performed in a conventional slaughter house and packing plant. Examples 9–23 employed the spun-bonded polypropylene of this invention (shroud type #1) and compared with the cotton shroud (shroud type #2).

| Example No. | Carcass No. | Hot Weight | Cold Weight | % Shrink |
|---|---|---|---|---|
| SHROUD #1 - DRY SPUN-BONDED POLYPROPYLENE | | | | |
| 9 | 8905 | 552.00 | 547.00 | .91 |
| 10 | 8906 | 761.00 | 754.00 | .92 |
| 11 | 8907 | 812.00 | 807.00 | .62 |
| 12 | 8908 | 536.00 | 531.00 | .93 |
| 13 | 8909 | 727.00 | 722.00 | .69 |
| 14 | 8910 | 612.00 | 606.00 | .98 |
| 15 | 8911 | 737.00 | 730.00 | .95 |
| 16 | 8912 | 709.00 | 702.00 | .99 |
| 17 | 8913 | 687.00 | 681.00 | .87 |
| 18 | 8914 | 710.00 | 704.00 | .85 |
| 19 | 8915 | 778.00 | 771.00 | .90 |
| 20 | 8916 | 786.00 | 779.00 | .89 |
| 21 | 8917 | 692.00 | 686.00 | .87 |
| 22 | 8918 | 641.00 | 635.00 | .94 |
| 23 | 8919 | 753.00 | 746.00 | .93 |
| AVERAGES | | 699.53 | 693.40 | .88 |
| SHROUD #2 - COTTON | | | | |
| 24 | 9005 | 791.00 | 783.00 | 1.01 |
| 25 | 8904 | 850.00 | 842.00 | .94 |
| 26 | 8928 | 749.00 | 742.00 | .93 |
| 27 | 9001 | 786.00 | 779.00 | .89 |
| 28 | 9002 | 744.00 | 737.00 | .94 |
| 29 | 9003 | 762.00 | 755.00 | .92 |
| 30 | 9024 | 641.00 | 635.00 | .94 |
| 31 | 9033 | 783.00 | 776.00 | .89 |
| 32 | 8903 | 704.00 | 698.00 | .85 |
| 33 | 8921 | 724.00 | 717.00 | .97 |
| 34 | 8925 | 758.00 | 751.00 | .92 |
| 35 | 9047 | 943.00 | 934.00 | .95 |
| 36 | 9048 | 942.00 | 933.00 | .96 |
| 37 | 9022 | 778.00 | 771.00 | .90 |
| 38 | 9010 | 842.00 | 834.00 | .95 |
| 39 | 9074 | 815.00 | 807.00 | .98 |
| 40 | 9035 | 848.00 | 840.00 | .94 |
| 41 | 9037 | 835.00 | 827.00 | .96 |
| 42 | 9008 | 711.00 | 704.00 | .98 |
| 43 | 8901 | 805.00 | 798.00 | .87 |
| 44 | 8922 | 708.00 | 701.00 | .99 |
| 45 | 8924 | 710.00 | 703.00 | .99 |
| 46 | 8923 | 651.00 | 645.00 | .92 |
| 47 | 9012 | 898.00 | 889.00 | 1.00 |
| 48 | 9016 | 731.00 | 724.00 | .96 |
| 49 | 9017 | 783.00 | 776.00 | .89 |
| 50 | 9014 | 895.00 | 886.00 | 1.01 |
| 51 | 9015 | 841.00 | 833.00 | .95 |
| 52 | 9020 | 648.00 | 642.00 | .93 |
| 53 | 9004 | 848.00 | 840.00 | .94 |
| 54 | 9009 | 786.00 | 779.00 | .89 |
| 55 | 8902 | 790.00 | 782.00 | 1.01 |
| 56 | 5428 | 651.00 | 645.00 | .92 |
| 57 | 5412 | 684.00 | 678.00 | .88 |
| 58 | 5430 | 672.00 | 667.00 | .74 |
| 59 | 5433 | 635.00 | 629.00 | .94 |
| 60 | 5418 | 573.00 | 568.00 | .87 |
| 61 | 5422 | 559.00 | 554.00 | .89 |
| 62 | 5407 | 551.00 | 546.00 | .91 |
| AVERAGES | | 754.49 | 747.44 | .93 |

The dry spun-bonded polypropylene shroud was applied to the slaughtered carcass in the same manner as in Examples 1-4 except that the cooling procedure was the same as that normally encountered in a commercial packing plant, i.e., after slaughter, the carcasses were covered with a dry shroud and transported to a cooler. In the case of the cotton shrouds, according to the prior art technique, the shrouds were soaked in brine and placed onto the carcass. The cooling of the cotton shrouds occurred in the same fashion as the spun-bonded polypropylene shroud. Again, the results of examples 1-8 were confirmed in that there was no difference in shrinkage between the shrouds and, on a commercial plant basis, the advantages of the invention were achieved.

According to the present invention, a hydrophobic, oleophilic liquid water porous polyolefinic material is used as a carcass shroud. The material is also inexpensive enough to be used as disposable carcass shroud. Further, due to the nature of the material, it adheres to the fatty surface of the carcass, but does not adhere to blood or water on the carcass. It permits surface water to be easily removed from the carcass, and due to the presence of a surfactant, it tends to draw blood from the surface of the carcass quickly through and into the shroud. As developed above, it is important that liquid water passes through the shroud. The carcass shroud according to the present invention can also be removed very easily from the carcass without pulling with it surface fat and without leaving behind unwanted fibers. Accordingly, a carcass shroud according to the present invention, is disposable, more easily applied, and less expensive than prior art carcass shrouds. It also produces beef sides which are not contaminated to any significant degree with microorganisms or foreign matter in comparison to the prior art carcass shrouds.

Having thus described our invention, we claim:

1. A carcass shroud for use during animal slaughter comprising a liquid water porous hydrophobic oleophilic polyolefin sheet, said sheet having a porosity effective to permit liquid surface water on a shrouded carcass to pass through said shroud instantly upon contact under pressure with the warm fatty surface of the carcass and to adhere smoothly to said surface while being readily separable from the firm fat of the cooled carcass.

2. The carcass shroud of claim 1 wherein said sheet is a non-woven web or film having said water liquid porosity.

3. The carcass shroud of claim 1 in a dry state and further including a surfactant uniformly distributed thereon.

4. The carcass shroud of claim 3 wherein said surfactant is a non-ionic surfactant.

5. The carcass shroud of claim 1 further including solid sodium chloride.

6. The carcass shroud of claim 1 wherein said sheet is a thin polyolefin film having a thickness of about 0.5 to about 1 mil.

7. The carcass shroud of claim 1 wherein said sheet is spun-bonded polypropylene.

8. The carcass shroud claimed in claim 1 wherein said polyolefin is selected from the group consisting of polyethylene, polypropylene and polybutadiene and copolymers thereof.

9. A dry carcass shroud for use during animal slaughter comprising a liquid water porous hydrophobic oleophilic polyolefin sheet having a foodgrade surfactant in a dried state dispersed on said sheet, said sheet having a porosity effective to permit liquid surface water on a shrouded carcass to pass through said shroud instantly upon contact under pressure with the warm fatty surface of the carcass and to adhere smoothly to said surface while being readily separable from the firm fat of the cooled carcass.

10. The dry carcass shroud of claim 9 consisting of spun-bonded polypropylene having a basis weight of from about 1 oz./yd.$^2$ to about 2 oz./yd.$^2$ and a thickness of from about 8 mils to about 16 mils.

11. The dry carcass shroud of claim 9 having a non-ionic alkylphenoxy polyoxyethylene glycol surfactant.

12. The dry carcass shroud of claim 11 wherein said surfactant is contained in an amount of about 6 g/yd.$^2$.

13. The dry carcass shroud of claim 9 wherein said sheet is a spun-bonded polypropylene.

14. The dry carcass shroud of claim 9 wherein said sheet is a polyethylene or polypropylene film of about 0.5 to about 1 mil in thickness.

* * * * *